United States Patent
Yang

(10) Patent No.: US 9,100,271 B2
(45) Date of Patent: Aug. 4, 2015

(54) ROUTING METHOD, ROUTING APPARATUS, AND COMMUNICATIONS SYSTEM

(75) Inventor: Shengqiang Yang, Shenzhen (CN)

(73) Assignee: Huawei Technologies Co, Ltd., Shenzhen (CN)

( * ) Notice: Subject to any disclaimer, the term of this patent is extended or adjusted under 35 U.S.C. 154(b) by 244 days.

(21) Appl. No.: 13/226,186

(22) Filed: Sep. 6, 2011

(65) Prior Publication Data

US 2012/0030373 A1 Feb. 2, 2012

Related U.S. Application Data

(63) Continuation of application No. PCT/CN2010/070795, filed on Feb. 27, 2010.

(30) Foreign Application Priority Data

Mar. 4, 2009 (CN) .......................... 2009 1 0047250

(51) Int. Cl.
G06F 15/173 (2006.01)
H04L 12/701 (2013.01)
H04L 12/54 (2013.01)
H04L 29/08 (2006.01)

(52) U.S. Cl.
CPC ............ *H04L 45/00* (2013.01); *H04L 12/5692* (2013.01); *H04L 29/08945* (2013.01); *H04L 29/08972* (2013.01)

(58) Field of Classification Search
USPC ........................................................ 709/244
See application file for complete search history.

(56) References Cited

U.S. PATENT DOCUMENTS 6,243,754 B1 * 6/2001 Guerin et al. .................. 709/227
6,332,157 B1 * 12/2001 Mighdoll et al. ............. 709/217

(Continued)

FOREIGN PATENT DOCUMENTS

CN 1797967 A 7/2006
CN 1860809 A 11/2006

(Continued)

OTHER PUBLICATIONS

3rd Generation Partnership Project, "Technical Specification Group Services and System Aspects; Technical Specifications and Technical Reports for a UTRAN-based 3GPP System" (Release 5) 3GPP TS 21.101. V5.13.0, Dec. 2007.

(Continued)

*Primary Examiner* — Shirley Zhang
(74) *Attorney, Agent, or Firm* — Brinks Gilson & Lione

(57) ABSTRACT

A routing method, apparatus, and communications system are provided. A routing method is applied to a network shared by multiple operators. The method includes: when receiving a service request message of a user terminal, obtaining, according to the shared resources occupied by the user terminal, the information about the operator to which the occupied shared resources belong from the resource configuration database; and matching the routing information in the connection route list according to the information about the operator to which the occupied shared resources belong, and forwarding the service request message according to successfully matched routing information. With the technical solutions, the operator to which the shared resources belong can charge for the call services of the user terminal.

11 Claims, 6 Drawing Sheets

(56) References Cited

U.S. PATENT DOCUMENTS

| | | | |
|---|---|---|---|
| 6,389,024 | B1 | 5/2002 | Ghai et al. |
| 7,225,220 | B2 * | 5/2007 | Gonzalez et al. ............ 709/202 |
| 2002/0174247 | A1 * | 11/2002 | Shen ............................. 709/238 |
| 2003/0058884 | A1 * | 3/2003 | Kallner et al. ................ 370/465 |
| 2003/0191841 | A1 * | 10/2003 | DeFerranti et al. .......... 709/226 |
| 2004/0139204 | A1 * | 7/2004 | Ergezinger et al. .......... 709/229 |
| 2007/0121539 | A1 * | 5/2007 | Kikuchi ........................ 370/328 |
| 2008/0104272 | A1 * | 5/2008 | Morris .......................... 709/238 |
| 2008/0167048 | A1 | 7/2008 | Liu et al. |
| 2009/0028166 | A1 * | 1/2009 | Pushparaj et al. ............ 370/401 |
| 2009/0052424 | A1 * | 2/2009 | Shah ............................. 370/338 |
| 2009/0234952 | A1 * | 9/2009 | Wu ............................... 709/226 |
| 2009/0305703 | A1 | 12/2009 | Shang et al. |
| 2010/0061230 | A1 * | 3/2010 | Xiong et al. .................. 370/225 |
| 2010/0202428 | A1 * | 8/2010 | Thompson et al. ........... 370/338 |
| 2010/0211631 | A1 * | 8/2010 | Lee et al. ...................... 709/203 |
| 2011/0099072 | A1 * | 4/2011 | Karaoguz et al. .......... 705/14.64 |

FOREIGN PATENT DOCUMENTS

| | | |
|---|---|---|
| CN | 1878356 A | 12/2006 |
| CN | 1882117 A | 12/2006 |
| CN | 1882179 A | 12/2006 |
| CN | 1980173 A | 6/2007 |
| CN | 1983973 A | 6/2007 |
| CN | 1984427 A | 6/2007 |
| CN | 101064907 A | 10/2007 |
| CN | 101094160 A | 12/2007 |
| CN | 101156490 A | 4/2008 |
| CN | 101217710 A | 7/2008 |
| CN | 101316257 A | 12/2008 |
| CN | 101511131 A | 8/2009 |
| EP | 1280365 A2 | 1/2003 |
| EP | 1965593 A1 | 9/2008 |
| WO | WO 02/073993 A1 | 9/2002 |
| WO | WO 2006/118497 A1 | 11/2006 |
| WO | WO 2010/099728 A1 | 9/2010 |

OTHER PUBLICATIONS

Extended European Search Report issued in corresponding European Patent Application No. 10748318.2, mailed Oct. 7, 2011.

Written Opinion of the International Searching Authority issued in corresponding PCT Patent Application No. PCT/CN2010/070795, mailed Jun. 3, 2010.

International Search Report issued in corresponding PCT Patent Application No. PCT/CN2010/070795, mailed Jun. 3, 2010.

3$^{rd}$ Generation Partnership Project, "Technical Specification Group Services and System Aspects; Network Sharing; Architecture and Functional Description" Release 8, 3GPP TS 23.251. V8.1.0, Mar. 2009.

Office Action issued in corresponding European Patent Application No. 10748318.2, mailed Jun. 21, 2013, 8 pages.

* cited by examiner

ROUTING METHOD, ROUTING APPARATUS, AND COMMUNICATIONS SYSTEM

CROSS-REFERENCE TO RELATED APPLICATIONS

This application is a continuation of International Application No. PCT/CN2010/070795, filed on Feb. 27, 2010, which claims priority to Chinese Patent Application No. 200910047250.X, filed on Mar. 4, 2009, both of which are hereby incorporated by reference in their entireties.

FIELD OF THE INVENTION

The present invention relates to communications technologies, and in particular, to a routing method, a routing apparatus, and a communications system.

BACKGROUND OF THE INVENTION

Sharing of a telecommunication device by multiple operators exists on both a wireless and a wired network, which is described in the following from the two aspects of a shared wireless network and wired network.

On a shared wireless network, for example, in a universal mobile telecommunications system (UMTS), the UMTS terrestrial radio access network (UTRAN) may connect to core network (CN) devices of multiple operators concurrently. In this manner, the UTRAN is shared by multiple operators. The UTRAN allocates a unique network resource identifier (NRI) to each connected CN device. The NRI is reported when a user terminal makes a call. The UTRAN then routes, according to the NRI, the user terminal call to the CN device corresponding to the NRI. The operator corresponding to the CN device charges for the calls and effectively controls the call services. Therefore, it is possible for the user terminal to access the UTRAN over the carrier provided by other operators instead of the carrier provided by the operator servicing the user terminal.

In another prior art, a base station controller (BSC) of a shared wireless access network resolves an operator identity a ccording to the international mobile subscriber identity (IMSI) of a user terminal, and routes the user terminal call to the CN device servicing the user terminal. The operator using the CN device charges for the calls and effectively controls the call services. Therefore, it is possible for a user terminal to access to the shared wireless CN over the carrier provided by another operator instead of the carrier provided by the operator servicing the user terminal.

The prior art has the following problem: The user terminal may access the shared wireless network over the carrier provided by other operators, occupying the dedicated carrier resources of other operators. However, other operators cannot supervise this situation, and therefore they fail to charge for the call or effectively control the call services.

On a shared wired network, port resources may be the dedicated resources deployed by operators, for example, a telecommunication access device shared by multiple operators, that is, a broadband remote access server (BRAS), an asymmetric digital subscriber line (ADSL) port deployed in a public place, or a wireless local area network (WLAN) port. Deployment of such resources requires high costs. The prior art has such a problem: The user terminal selects an operator network according to a user account when accessing services through these ports. As a result, the operators who deploy these ports fail to effectively control the call services.

It can be seen from the preceding description that, in the prior art, the user terminal can access a shared network through dedicated resources of other operators regardless of whether the shared network is a wireless network or a wired network. However, the operators who have these dedicated resources cannot effectively control the call services.

SUMMARY OF THE INVENTION

To solve the preceding technical problems, in one aspect, an embodiment of the present invention provides a routing method.

The routing method is applied to a network shared by multiple operators. On the shared network, information about an operator to which the shared resources belong is included in a resource configuration database of a shared telecommunication device and routing information of a dedicated network of each operator is included in a connection route list of the shared telecommunication device, where the information about the operator is included in the routing information. The method includes:

when receiving a service request message of a user terminal, obtaining, according to the shared resources occupied by the user terminal, the information about the operator to which the occupied shared resources belong from the resource configuration database; and matching the routing information in the connection route list according to the information about the operator to which the occupied shared resources belong, and forwarding the service request message of the user terminal according to successfully matched routing information.

In another aspect, an embodiment of the present invention provides a routing apparatus, which is applied to a shared telecommunication device. The apparatus includes:

a resource configuration database, configured to store information about the operator to which resources belong.

a connection route list module, configured to store information about an operator to which a route connected to a dedicated network of multiple operators belongs;

an obtaining module, configured to obtain, according to the operator dedicated resources occupied by a call service request message of a user terminal, information about the operator to which operator dedicated resources belong from the resource configuration database;

a matching module, configured to match the information about the operator to which the operator dedicated resources belong with the information about the operator to which a corresponding route in the connection route list belongs;

a forwarding module, configured to forward the call service request message of the user terminal along the route corresponding to successfully matched operator information.

Still another embodiment of the present invention provides a communications system, including the preceding routing apparatus.

It can be seen from the technical solutions provided by embodiments of the present invention that, when a network device is shared, when the operator dedicated resources are occupied by a user terminal serviced by other operators, the shared telecommunication device can forward the call service request message of the user terminal to the operator dedicated network to which the dedicated resources belong. The operator to which the dedicated resources belong records the call service condition of the user terminal, charges for a call, and effectively controls the call service.

BRIEF DESCRIPTION OF THE DRAWINGS

To make the technical solutions of the present invention clearer, the accompanying drawings for illustrating the embodiments of the present invention or the prior art are described below. Apparently, the accompanying drawings are for the exemplary purpose only, and a person skilled in the art can derive other drawings from such accompanying drawings without any creative effort.

DETAILED DESCRIPTION OF THE EMBODIMENTS

To enable those skilled in the art to better understand the technical solutions of the present invention, the following describes the technical solutions with reference to the accompanying drawings. Apparently, the accompanying drawings are for the exemplary purpose only. Those skilled in the art can derive other embodiments from the embodiments given here without any creative effort, and all such embodiments shall fall within the protection scope of the present invention.

In embodiments of the present invention, a shared device refers to the telecommunication device used by contract users of different operators. The shared resources, such as carrier resources and port resources, refer to the communications resources deployed in the shared device or managed by the shared device, which may be used by contract users who belong to different operators. Generally, the shared resources belong to an operator, for example, the shared resources that are purchased or deployed by the operator are also the dedicated resources of the operator.

Figure 1:
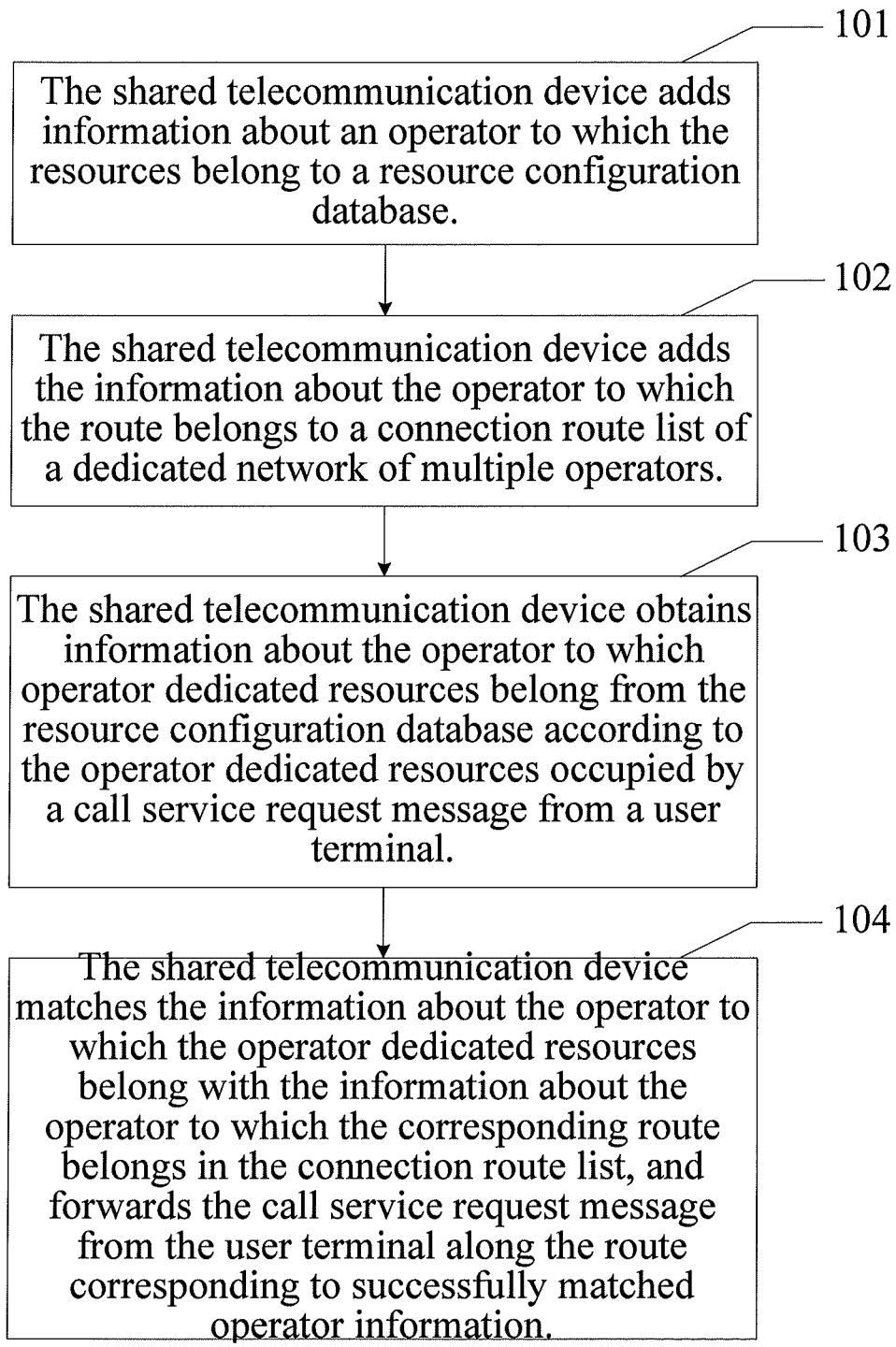
FIG. 1 is a schematic flow chart of a routing method according to an embodiment of the present invention.

The following section describes an embodiment providing a routing method. The embodiment may be applied to a network shared by multiple operators. FIG. 1 shows a schematic flow chart of the method according to this embodiment. The method includes the following steps Step 101: The shared telecommunication device adds information about an operator to which the resources belong to a resource configuration database.

The resources include but are not limited to wireless access resources and wired access resources. The wireless access resources include resources such as sector and carrier, and the wired access resources include all types of wired communication port resources.

The shared telecommunication device includes wireless and wired access telecommunication devices shared by multiple operators. The wireless access telecommunication device includes a wireless base station subsystem (BSS) device; the wired access telecommunication device includes a BRAS.

Further, keywords may be searched by resource ID in the resource configuration database so as to search for and query the resources in the resource configuration database according to the resource ID.

The operator information can be an operator identity, or an operator code uniformly allocated by an authority.

After the information about the operation to which the resources belong is added to the configuration database, the resources are dedicated resources of the operator corresponding to the information about the operator.

Step 102: The shared telecommunication device adds the information about the operator to which the route belongs to a connection route list of dedicated network of multiple operators.

The dedicated network of the operator refers to the network exclusively used by the operator instead of being shared by other operators.

The shared telecommunication device is connected to at least one operator dedicated network.

The connection route list includes but is not limited to the connection route lists in a time division multiplexing (TDM) link mode and in IP mode.

After the information about the operation to which the connection route belongs is added to the connection route list, the target network to which the connection route connects is the dedicated network of the corresponding operator.

In the connection route list, the connection routes can be searched by operator information so as to facilitate the matching process according to the operator information.

The operation information may be an operator identity, or an operator code uniformly allocated by an authority. The operator information in the connection route table is consistent with the operator information in the resource configuration database in terms of the representation form.

Step 103: The shared telecommunication device obtains information about the operator to which operator dedicated resources belong from the resource configuration database according to the operator dedicated resources occupied by a call service request message of a user terminal.

The call service request message of the user terminal may include or may not include the information about the operator dedicated resources occupied by the user terminal.

A system directly obtains the information about the operator dedicated resources from the call service request message if the call service request message of the user terminal includes the information about the operator dedicated resources occupied by the user terminal.

The system directly obtains the information about the operator dedicated resources occupied by the user terminal according to the address of the communication port in the call service request, if the call service request message of the user terminal does not include the information about the operator dedicated resources occupied by the user terminal.

Obtaining the information about the operator to which the resources belong from the resource configuration database is querying the records of the operator dedicated resources according to the information about the dedicated resources occupied by the user terminal, and obtain the information about the operator to which the resources belong. The obtained information about the operator is the information about the operator to which the operator dedicated resources belong.

Step 104: The shared telecommunication device matches the information about the operator to which the operator dedicated resources belong with the information about the operator to which the corresponding route in the connection route list belongs, and forwards the call service request message of the user terminal along the route corresponding to successfully matched operator information.

The matching process is to find the routing records, which is consistent with the information about the operator to which the resources belong and is being in the connection state.

The successfully matched route records may be one, multiple, or the route record that is not successfully matched.

If one route record is successfully matched, the call service request message of the user terminal is forwarded along the route corresponding to the route record.

If multiple route records are successfully matched, a selection policy may be used to select one of the successfully matched route records, and the call service request message of the user terminal is forwarded along the route corresponding to the selected route record. According to the selection policy, the first successfully matched route record or any of the successful matched route records is selected, or a route record with an optimal weight assessment among the route records is selected according to the weight assessment information of the route. The weight assessment of the route may be load information indicating to what extent the route is busy or idle.

If no successfully matched route record exists, the call service request message may be forwarded along a default route specified by the system; or any one route record in the connection route list may be selected to forward the call service request message; or the information about the operator to which the user terminal belongs is used to match the information about the operator to which the corresponding route in the connection route list belongs; and the call service request message of the user terminal is forwarded along a successfully matched route. The foregoing cases all do not affect the implementation of this embodiment.

The forwarded call service request message of the user terminal may be a call connection request message or a notification message about resource occupying. Both the call connection request message and the notification message about resource occupying carry the user information about the user terminal and information about the resources occupied by the user terminal.

If the forwarded call service request message of the user terminal is a call connection request message, a call connection is set up between the user terminal and the operator dedicated network corresponding to the route. As a result, the call initiated by the user terminal is connected from the shared telecommunication device to the operator dedicated network corresponding to the route. The operator dedicated network may control the calls of the user terminal, records the call details, and charges for the calls.

If the forwarded call service request message is a notification message about resource occupying, only the event indicating that the call service request message of the user terminal occupies the operator dedicated resources is reported to the operator dedicated network to which the dedicated resources belong. The calls of the user terminal may not be connected to the operator dedicated network corresponding to the route from the shared telecommunication device. In this manner, the speech path rerouting is reduced and the communication efficiency is enhanced.

The notification message about resource occupying may be sent one or multiple times. For example, during the entire call service connection setup process of the user terminal, the notification message about resource occupying is sent at intervals, reporting the operator dedicated resources occupied by the user terminal. When the call service connection of the user terminal is released, the notification message about resource occupying is sent, reporting that the user terminal releases the call service connection and does not occupy the operator dedicated resources any more. Through the notification message about resource occupying, the operator dedicated network corresponding to the resources may record the call details and charge for the calls, and control the call services. The control command is sent to the shared telecommunication device through a response message and is executed by the shared telecommunication device.

Figure 2A:
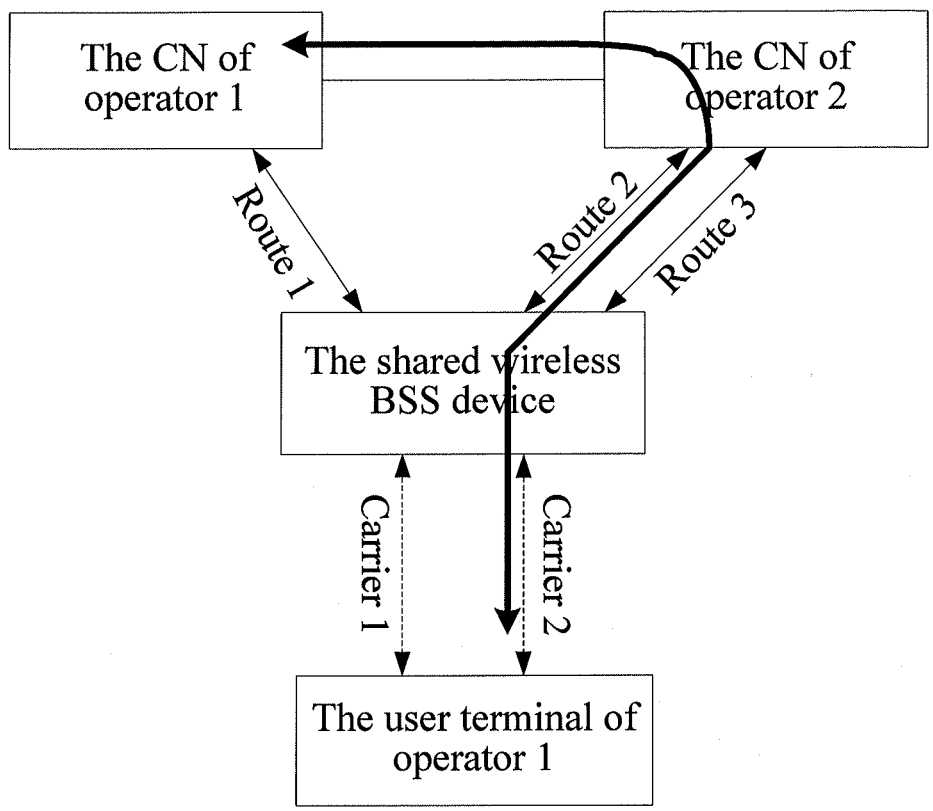
FIG. 2*a* is a schematic diagram of a network showing the application of a routing method according to a second embodiment of the present invention.
Figure 2B:
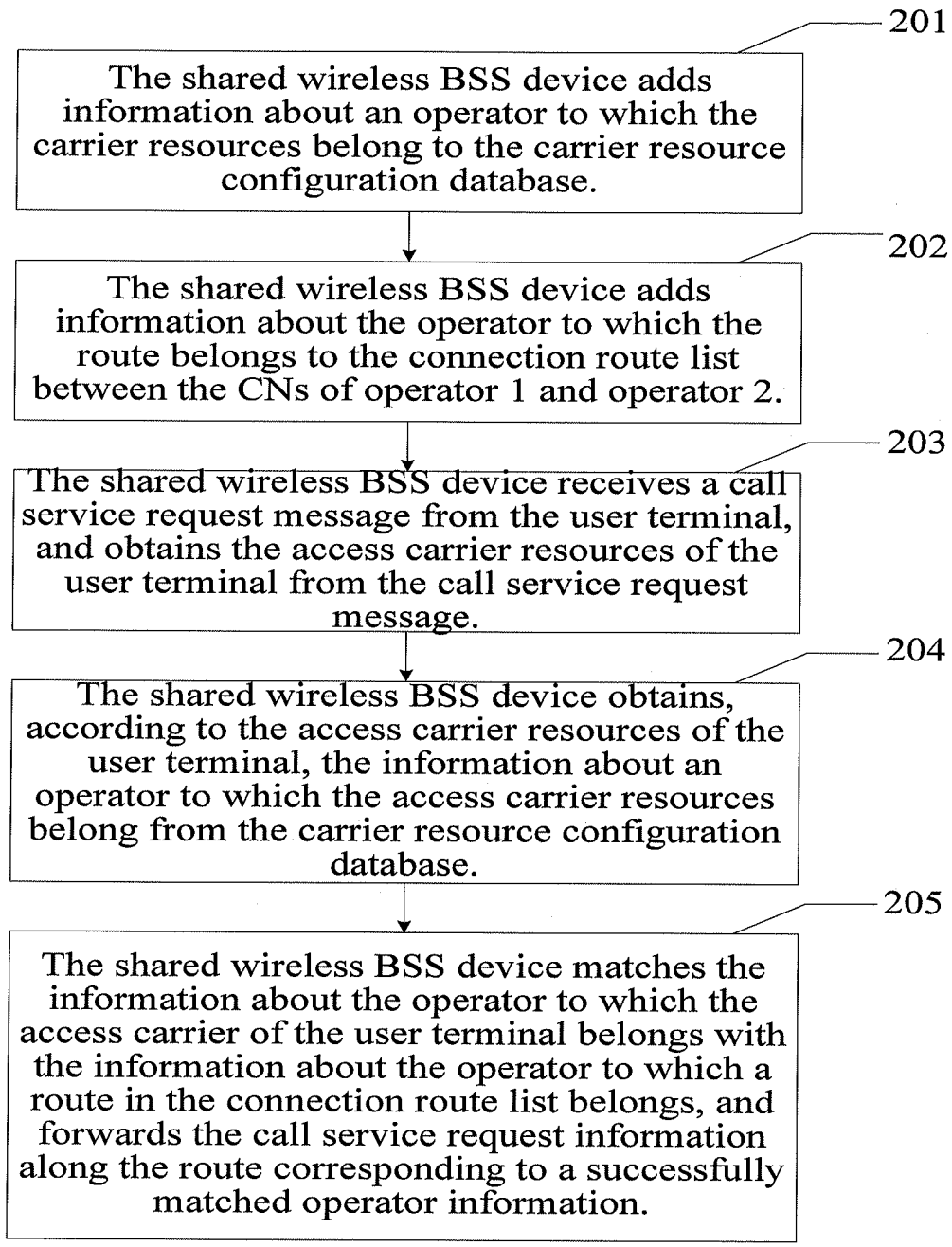
FIG. 2*b* is a schematic flow chart of a routing method according to the second embodiment of the present invention.

The following section describes a second embodiment providing the routing method. The embodiment is applied to a network shared by multiple operators. FIG. 2a shows a schematic diagram of the network according to this embodiment. The user terminal serviced by operator 1 accesses the wireless BSS device over carrier 2, accesses the CN of operator 2 through route 2, and then is forwarded to the CN of operator 1. FIG. 2b shows a schematic flow chart of the embodiment, including the following steps:

Step 201: A shared wireless BSS device adds information about an operator to which the carrier resources belong to a carrier resource configuration database.

The shared wireless BSS device refers to wireless BSS device shared by multiple operators. It may be the wireless BSS device of the global system of mobile communication (GSM), code division multiple access (CDMA), wideband CDMA (WCDMA), time-division CDMA (TD-SCDMA), and worldwide interoperability for microwave access (WiMAX). The wireless BSS device may include a base transceiver station (BTS) device and wireless BSC device.

The carrier resource configuration database is located in the wireless BSC device.

Carrier resources are purchased by the wireless network operator from the government and are the operator dedicated resources. Carrier resources vary with operators. For example, carrier with frequency band of 870 MHz-880 MHz belongs to operator 1 and carrier with frequency band of 900 MHz-910 MHz belongs to operator 2.

The information about an operator may be an operator identity, or an operator code uniformly allocated by an authority.

The carrier resources and operator information corresponding to the carrier resources are added to the carrier resource configuration database of the wireless BSS. Only two operators are taken as examples for illustration in the following table.

| Carrier | Operator information |
| --- | --- |
| Carrier 1 | Operator 1 |
| Carrier 2 | Operator 2 |

Carrier 1 is a carrier resource whose frequency band ranges from 870 MHz to 880 MHz; and carrier 2 is a carrier resource whose frequency band ranges 900 MHz to 910 MHz.

The user's wireless terminal is a dual-mode terminal, supporting the foregoing two frequency bands. Such a dual-mode terminal can access the network over these two frequency bands. Accordingly, user's wireless terminal may access the network either over frequency band 1 or over frequency band 2. It is assumed that the user terminal is serviced by operator 1.

Step 202: The shared wireless BSS device adds information about the operator to which the route belongs to the connection route list of the CNs of operator 1 and operator 2.

The connection route list is shown in the following table.

| Route | Operator information |
| --- | --- |
| Route 1 | Operator 1 |
| Route 2 | Operator 2 |
| Route 3 | Operator 2 |

Step 203: The shared wireless BSS receives a call service request message of the user terminal, and obtains the access carrier resources of the user terminal from the call service request message.

The shared wireless BSS device obtains access carrier information from the call service request message. The access carrier information is the carrier resources occupied by the current call initiated by the user terminal.

Step 204: The shared wireless BSS device obtains, according to the access carrier resources of the user terminal, the information about an operator to which the access carrier resources belong from the carrier resource configuration database.

For example, when the access carrier of the user terminal serviced by operator 1 is carrier 2, the carrier resource configuration database is queried according to carrier 2 and it is known that the operator to which carrier 2 belongs is operator 2. In this way, the user terminal serviced by operator 1 occupies the carrier resources of operator 2.

Step 205: The shared wireless BSS device matches the information about the operator to which the access carrier of the user terminal belongs with the information about the operator to which a route in the connection route list belongs, and forwards the call service request message along the route corresponding to successfully matched operator information.

The forwarded call service request message is a call connection request message. The call connection request message includes the information about the user terminal and information about resources occupied by the user terminal. The user information about the user terminal is specifically the IMSI of the user terminal. The information about the resources occupied by the user terminal is the information about the access carrier resources of the user terminal.

As described above, the user terminal serviced by operator 1 initiates a call service over carrier 2. The information about the operator to which carrier 2 belongs is operator 2. In this case, the shared wireless BSS device uses the information about operator 2 to match the route in the connection route list, and routes 2 and 3 are both successfully matched. The shared wireless BSS device may select either route 2 or route 3 to forward the call service request message.

The CN of operator 2 receives the call service request message, which is a call connection request message, sets up a connection for the call, and forwards the call service request message to the CN of operator 1. Therefore, a call speech path is set up. The CN of operator 2 records the call details, charges for the calls, and controls the call services.

It can be seen that in embodiments of the present invention, regardless of whether a user terminal is serviced by operator 1 or operator 2, as long as the user terminal accesses the network through the carrier resources of operator 2, the shared wireless BSS device forwards the call service request message to the CN of operator 2 and the CN of operator 2 records the call details, charges for the calls, and controls the call services. When carrier resources of operators are occupied by the user terminal serviced by another operator, the operator can also subsequently charges for the corresponding calls and controls the call services.

Figure 3A:
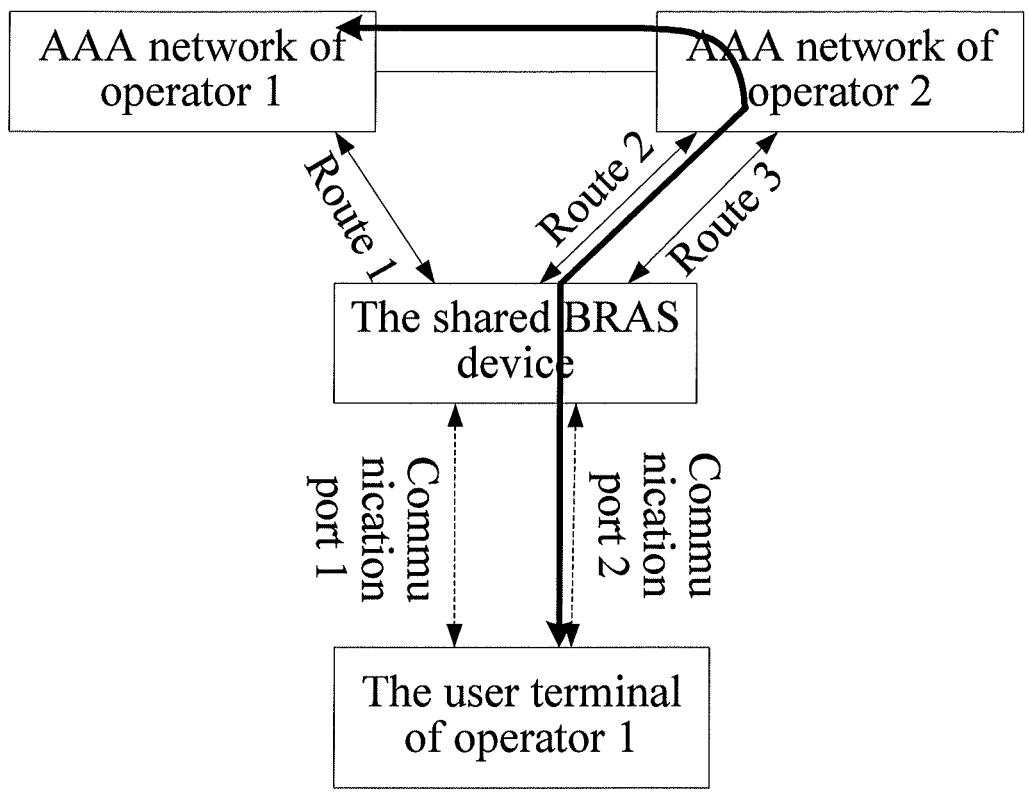
FIG. 3*a* is a schematic diagram of a network showing the application of a routing method according to a third embodiment of the present invention.
Figure 3B:
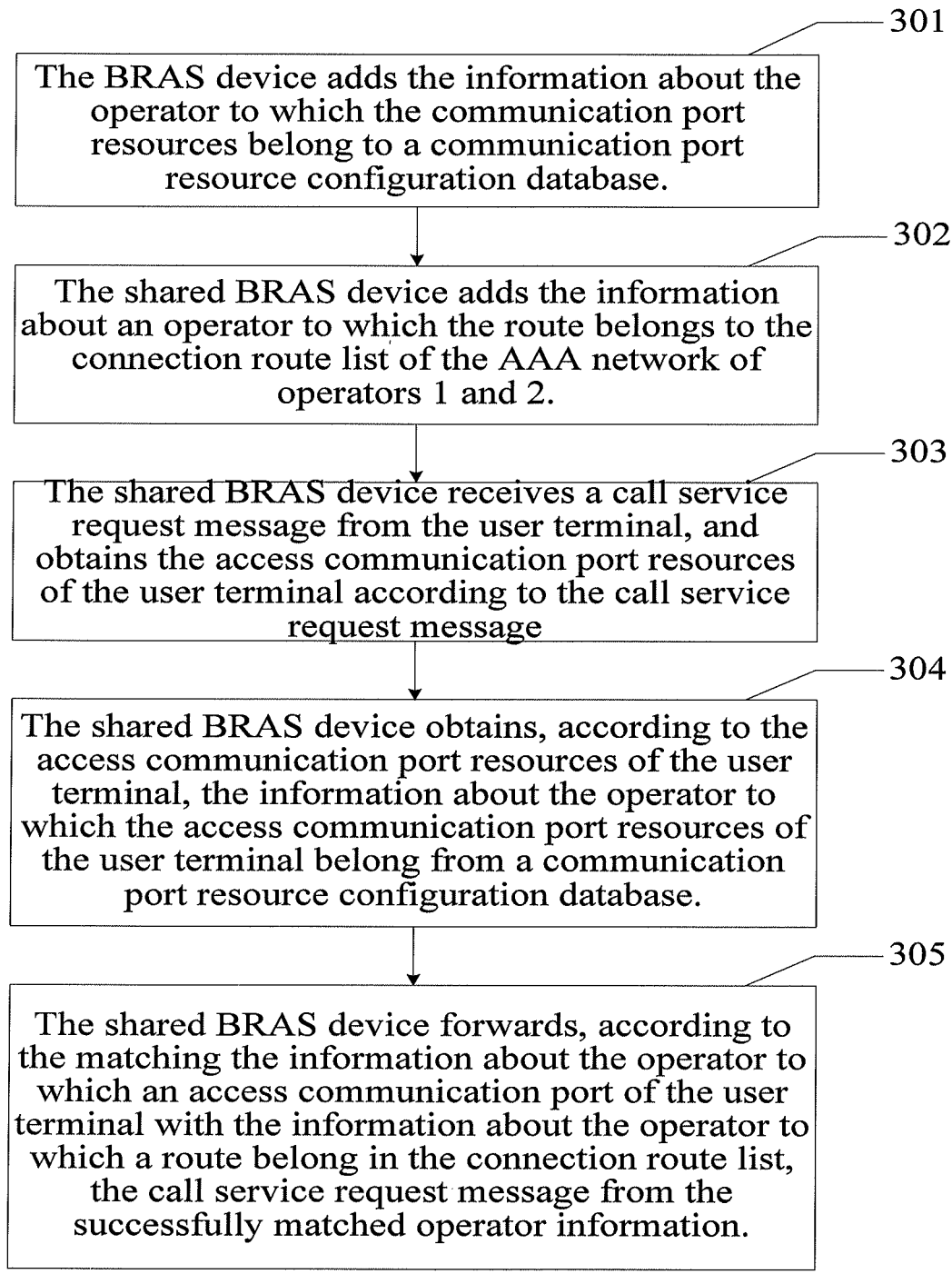
FIG. 3*b* is a flow chart of a routing method according to the third embodiment of the present invention.

The following section describes a third embodiment providing the routing method. The embodiment is applied to a wired network shared by multiple operators. FIG. 3a shows a schematic diagram of the network according to this embodiment. The user terminal serviced by operator 1 accesses the shared BRAS device through communication port 2, accesses the authentication, authorization, and accounting (AAA) network of operator 2 through route 2, and is forwarded to the AAA network of operator 1. FIG. 3b shows a schematic flow chart of a routing method according to this embodiment, including the following steps:

Step 301: The BRAS device adds the information about the operator to which the communication port resources belong to a communication port resource configuration database.

The shared BRAS device is a wired BRAS device shared by multiple operators. The communication port resource configuration database is located in the BRAS device.

The communication port resources include but are not limited to Ethernet access communication port resources, ADSL access communication port resources, or WLAN access communication port resources.

The communication port resources are the dedicated resources of wired network operators. Different operators have different communication port resources. For example, communication ports 1-50 on the BRAS device belongs to operator 1 and ports 51-100 are exclusively used by operator 2.

The operator information may be an operator identity, or an operator code uniformly allocated by an authority.

The shared BRAS device adds the information about the operator to which the communication port resources belong to a communication port resource configuration database. Only two operators are taken as examples for illustration in the following table.

| Communication port | Operator information |
| --- | --- |
| Communication port 1 | Operator 1 |
| Communication port 2 | Operator 2 |

The communication port 1 belongs to communication port resources with a communication port number from 1 to 50. The communication port 2 belongs to communication port resources with a communication port number from 51 to 100.

The user terminal may access from either communication port 1 or port 2. It is assumed that the user terminal is the user terminal serviced by operator 1.

Step 302: The shared BRAS device adds the information about the operator to which the route belongs to the connection route lists of the AAA network of operators 1 and 2.

The connection route list is shown in the following table.

| Route | Operator information |
| --- | --- |
| Route 1 | Operator 1 |
| Route 2 | Operator 2 |
| Route 3 | Operator 2 |

Step 303: The shared BRAS device receives a call service request message of the user terminal, and obtains the access communication port resources of the user terminal according to the call service request message.

The call service request message of the user terminal does not include the access communication port resources of the user terminal. The shared BRAS device obtains the access communication port resources of the user terminal according to the address of the communication port in the call service request message.

Step 304: The shared BRAS device obtains, according to the access communication port resources of the user terminal, the information about the operator to which the access communication port resources of the user terminal belong from a communication port resource configuration database.

For example, when the access communication port of the user terminal is communication port 2, the carrier resource configuration database is queried according to carrier 2 and it is known that the operator to which carrier 2 belongs is operator 2. In this way, the user terminal serviced by operator 1 occupies the communication port resources of operator 2.

Step 305: The shared BRAS device matches the information about the operator to which an access communication port of the user terminal belongs with the information about the operator to which a route in the connection route list belongs, and forwards the call service request message along the route corresponding to the successfully matched operator information.

The forwarded call service request message may be an AAA authentication request message, or a notification message about resource occupying. The AAA authentication request message and the notification message about resource occupying carry the user information about the user terminal and the information about the resources occupied by the user terminal. The user information is specifically a domain name, a user name, or password information. The information about resources is the information about access communication port resources of the user terminal.

As described above, the user terminal dials up to initiate an on-line request through communication port 2; the information about an operator to which communication port 2 belongs. In this case, the shared BRAS device uses the information about operator 2 to match the route in the connection route list, and routes 2 and 3 are both successfully matched. The shared BRAS device may select either route 2 or route 3 to forward the call service request message.

The AAA network of operator 2 receives the call service request message, which is a notification message about resource occupying, and provides admittance for the user terminal. If the AAA network denies access of the user terminal, the network notifies the BRAS to refuse the on-line request of the user terminal. If the AAA network allows access of the user terminal, an authentication request message is constructed and forwarded to the AAA network of operator 1 to which the user terminal belongs for authentication and authorization, or to notify the shared BRAS device to construct an authenticate request message and directly send the message to the AAA network of operator 1 to which the user terminal belongs to for authentication and authorization. The AAA network of operator 2 records the call details, charges for the calls, and controls the call services through the notification message about resource occupying forwarded by the shared BRAS device. The command for controlling call services is sent to the shared BRAS device through a response message, and executed by the shared BRAS device. The control may include forcibly releasing the occupied ports and adjusting the port rate.

It can be seen that in embodiments of the present invention, whether a user terminal is serviced by operator 1 or operator 2, as long as the user terminal accesses the network through the communication port resource of operator 2, the shared BRAS device forwards the call service request message to the AAA network of operator 2, and the AAA network of operator 2 records the call details, charges for the calls, and controls the call services. When the communication port resource of an operator is occupied by the user terminal serviced by other operators, the operator can also subsequently charges for the corresponding calls and controls the call services. It can be seen from the preceding description that, a dedicated resource belongs to an operator but may be used by user terminals of other operators.

The operator to which the dedicated resources belong can learn about the operator to which the user terminal that occupies the dedicated resources belong according to the information forwarded by a shared device, and therefore charges for the calls according to actual conditions, and then forwards the corresponding information to the operator to which the user terminal belongs.

Further, for higher efficiency, the control plane signaling may be forwarded to the operator to which the dedicated resources belong. However, user plane data may be routed directly by the shared device to the operator to which the user terminal belongs.

According to the preceding embodiments of the present invention, those skilled in the art can easily understand that the embodiments of the present invention may be implemented by means of software in combination with a necessary general hardware platform. Based on such understandings, all or part of the technical solutions in the embodiments of the present invention that makes contributions to the prior art may be essentially embodied in the form of a software product. The computer software product may be stored in a storage medium, such as a ROM, a RAM, a magnetic disk, or an optical disk. The software product includes several instructions that enable a computer device (a PC, server, or network device) to execute the methods provided in the embodiments of the present invention.

Figure 4:
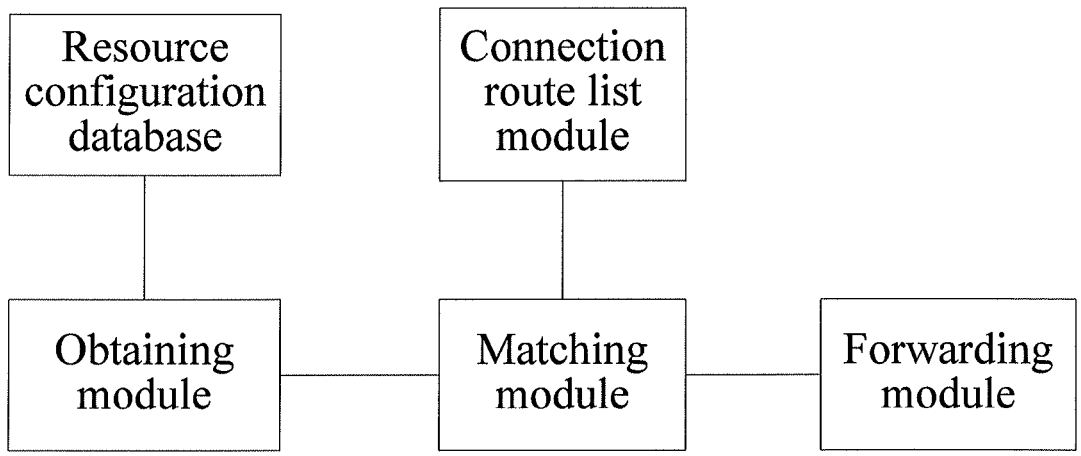
FIG. 4 is a schematic structural block diagram of a routing apparatus according to an embodiment of the present invention.

The following section describes an embodiment providing a routing apparatus. The embodiment is applied to a shared telecommunication device. The apparatus modules in this embodiment are located in the access telecommunication device shared by multiple operators. FIG. 4 shows a schematic diagram of the routing apparatus according to this embodiment. The routing apparatus includes:

a resource configuration database, configured to store information about an operator to which resources belong;

a connection route list module, configured to store information about an operator to which a route to a dedicated network of multiple operators belongs.

an obtaining module, configured to obtain, according to the operator dedicated resources occupied by a call service request message of a user terminal, information about the operator to which operator dedicated resources belong from the resource configuration database;

a matching module, configured to match the obtained information about the operator to which the resources belong with the information about the operator to which a route in the connection route list belongs; and a forwarding module, configured to forward the call service request message of the user terminal along the route corresponding to successfully matched operator information.

When the shared telecommunication device is a wireless access telecommunication device shared by multiple operators, the resource configuration database includes the carrier resource configuration database, and the operator dedicated resources include the carrier resources. The wireless access telecommunication device shared by multiple operators includes a wireless BSS device.

When the shared telecommunication device is a wired access telecommunication device shared by multiple operators, the resource configuration database includes the communication port resource configuration database, and the operator dedicated resources include communication port resources. The wired access telecommunication device shared by multiple operators includes a BRAS device.

Figure 5:
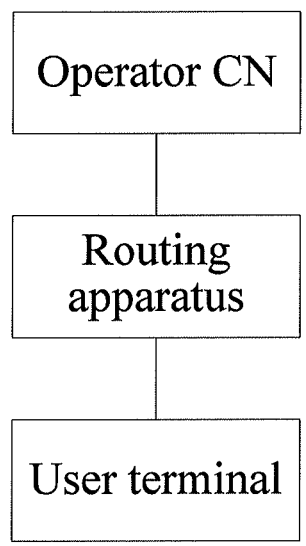
FIG. 5 is a schematic structural block diagram of a communications system according to an embodiment of the present invention.

The following section describes an embodiment providing a routing system. FIG. 5 shows a block diagram of the system according to this embodiment. The system includes:

a user terminal, configured to send a call service request message to a routing apparatus; and a routing apparatus, configured to pre-add information about an operator to which resources belong to a resource configuration database shared by multiple operators; pre-add information about an operator to which the route belongs to a connection route list of the telecommunication device shared by multiple operators and dedicated network of multiple operators, receive the call service request message of the user terminal, and obtain information about the operator to which operator dedicated resources belong from the resource configuration database according to the operator dedicated resources occupied by the call service request message of the user terminal, match the information about the operator to which the operator dedicated resources belong with the information about the operator to which the route in the connection route list belongs, and forwards the call service request message to operator CN from the user terminal along the route corresponding to successfully matched operator information.

The routing apparatus is located in an access telecommunication device shared by multiple operators.

When the telecommunication device shared by multiple operators is a wireless access telecommunication device shared by multiple operators, the resource configuration database includes the carrier resource configuration database, and the operator dedicated resources include the carrier resources. The wireless access telecommunication device shared by multiple operators includes the wireless BSS device.

When the telecommunication device shared by multiple operators is a wired access telecommunication device shared by multiple operators, the resource configuration database includes the communication port resource configuration database, and the operator dedicated resources include communication port resources. The wired access telecommunication device shared by multiple operators includes the BRAS device.

The operator CN is configured to record the call details, charges for the calls, and controls the call services, according to the call service request message of the user terminal.

If the operator CN is not the CN of the operator to which the user terminal belongs, the operator CN forwards the call service request message to the CN of the operator to which the user terminal belongs. Therefore, a call speech path is set up.

The embodiments of the present invention described above shall not be construed as limitations to the present invention. Any modification, equivalent replacement, or improvement made without departing from the spirit and principle of the present invention should fall within the protection scope of the present invention.

What is claimed is:

1. A routing method in a network in which a telecommunication device is shared by multiple operators, comprising:

obtaining, by a routing apparatus, a carrier resource according to a received service request message from a user terminal, wherein the carrier resource is occupied by the user terminal;

obtaining, by the routing apparatus, information about a first operator of the multiple operators from a list of carrier resources for each of the multiple operators according to the obtained carrier resource, wherein the carrier resource belongs to the first operator;

selecting, by the routing apparatus, first routing information in a connection route list according to the information about the first operator, wherein the first routing information belongs to the first operator, and the connection route list provides routing information for each of the multiple operators; and forwarding, by the routing apparatus, the service request message according to the selected first routing information to a core network of the first operator.

2. The routing method according to claim 1, further comprising:

forwarding the service request message according to second routing information corresponding to a second operator of the multiple operators when determining that the user terminal belongs to the second operator.

3. The routing method according to claim 1, wherein the service request message comprises a call service request message, a call connection request message, or a notification message about resource occupying.

4. The routing method according to claim 1, wherein the selecting, by the routing apparatus, the first routing information comprises:

selecting, by the routing apparatus, multiple records of routing information in the connection route list according to the information about the first operator, wherein the multiple records of routing information belong to the first operator; and selecting, by the routing apparatus, according to a selection policy, any one of a first successfully selected record of the multiple record, any one of the multiple records, or a record with an optimal weight assessment among the multiple records as the first routing information;

wherein the optimal weight assessment is obtained based on a busy or idle extent of a route indicated by the routing information.

5. The routing method according to claim 1, wherein when the selecting the first routing information in the connection route list is unsuccessful, the method further comprises:

forwarding, by the routing apparatus, the service request message according to a default routing information or any one of routing information in the connection route list.

6. The routing method according to claim 1, wherein the telecommunication device shared by multiple operators comprises a wireless base station subsystem (BSS) device or a broadband remote access server (BRAS) device.

7. A routing apparatus applied to a telecommunication device shared by multiple operators, comprising:

a non-transitory storage medium, configured to store a list of carrier resources for each of the multiple operators and a list of routing information for each of the multiple operators;

at least one processor, configured to obtain a carrier resource according to a received service request message from a user terminal, wherein the carrier resource is occupied by the user terminal;

obtain information about a first operator of the multiple operators from the list of carrier resources for each of the multiple operators stored in the non-transitory storage medium according to the obtained carrier resource, wherein the carrier resource belongs to the first operator; and select first routing information from the list of routing information for each of the multiple operators stored in the non-transitory storage medium according to the information about the first operator, wherein the first routing information belongs to the first operator;

a transmitter, configured to forward the service request message according to the selected first routing information to a core network of the first operator.

8. The routing apparatus according to claim 7, wherein the telecommunication device shared by multiple operators is a wireless base station subsystem (BSS) device or a broadband remote access server (BRAS) device.

9. The routing apparatus according to claim 7, wherein the at least one processor, further configured to forward the service request message according to a second routing information corresponding to a second operator of the multiple operators when determining that the user terminal belongs to the second operator.

10. A computer readable non-transitory storage medium, storing a list of carrier resources for each of multiple operators, a connection route list and a computer program, wherein:

the connection route list provides routing information for each of the multiple operators;

the computer program causes a processor to perform:

obtaining a carrier resource according to a received service request message from a user terminal, wherein the carrier resource is occupied by the user terminal;

obtaining information about a first operator of the multiple operators from the list of carrier resources for each of the multiple operators according to the obtained carrier resource, wherein the carrier resource belongs to the first operator;

selecting first routing information from the connection route list according to the information about the first operator, wherein the first routing information belongs to the first operator; and forwarding the service request message, according to the selected first routing information, to a core network of the first operator.

11. A integrated circuit applied to a telecommunication device shared by multiple operators, comprising:

a first part, configured to obtain a list of carrier resources for each of the multiple operators and a list of routing information for each of the multiple operators;

a second part, configured to:

obtain a carrier resource according to a received service request message from a user terminal, wherein the carrier resource is occupied by the user terminal;

obtain information about a first operator of the multiple operators from the list of carrier resources for each of the multiple operators stored in the non-transitory storage medium according to the obtained carrier resource, wherein the carrier resource belongs to the first operator; and select first routing information from the list of routing information for each of the multiple operators stored in the non-transitory storage medium according to the information about the first operator, wherein the first routing information belongs to the first operator; and a third part, configured to forward the service request message according to the selected first routing information to a core network of the first operator.

* * * * *